United States Patent
Finkenaur, III

(10) Patent No.: US 12,460,107 B1
(45) Date of Patent: Nov. 4, 2025

(54) TAPE WITH DIFFERING STRENGTH ADHESIVES

(71) Applicant: RGF Materials Company, Phoenixville, PA (US)

(72) Inventor: Robert G. Finkenaur, III, Phoenixville, PA (US)

(73) Assignee: RGF Materials Company, Phoenixville, PA (US)

( * ) Notice: Subject to any disclaimer, the term of this patent is extended or adjusted under 35 U.S.C. 154(b) by 487 days.

(21) Appl. No.: 18/107,199

(22) Filed: Feb. 8, 2023

Related U.S. Application Data

(63) Continuation-in-part of application No. 16/668,976, filed on Oct. 30, 2019, now abandoned.

(51) Int. Cl.
 *C09J 7/20* (2018.01)
 *C09J 7/40* (2018.01)

(52) U.S. Cl.
 CPC ............... *C09J 7/203* (2018.01); *C09J 7/401* (2018.01); *C09J 2301/124* (2020.08); *C09J 2301/18* (2020.08); *C09J 2301/204* (2020.08); *C09J 2301/208* (2020.08); *C09J 2301/21* (2020.08); *C09J 2301/312* (2020.08)

(58) Field of Classification Search
 CPC ............ C09J 2301/204; C09J 2301/208; C09J 2301/21; C09J 7/203; C09J 7/401; C09J 2301/124; C09J 2301/18; C09J 2301/312
 See application file for complete search history.

(56) References Cited

U.S. PATENT DOCUMENTS

| | | | | |
|---|---|---|---|---|
| 2,174,567 A | * | 10/1939 | Dahmen | B05B 12/24 101/127 |
| 2006/0093775 A1 | * | 5/2006 | Konig | B65H 19/102 156/289 |
| 2006/0234014 A1 | * | 10/2006 | Liu | B65D 55/026 428/343 |
| 2008/0251201 A1 | * | 10/2008 | Sikkel | C08J 5/121 156/330 |
| 2009/0162595 A1 | * | 6/2009 | Ko | B05C 9/06 118/313 |
| 2011/0281084 A1 | * | 11/2011 | Ashwell | C09J 7/20 428/195.1 |

(Continued)

FOREIGN PATENT DOCUMENTS

EP    2463347 A2 * 6/2012 ............... C09J 7/38

*Primary Examiner* — Scott R. Walshon
(74) *Attorney, Agent, or Firm* — Joseph E. Maenner; Petock & Petock LLC

(57) ABSTRACT

A tape includes a substrate having a central longitudinal axis extending therethrough. The substrate includes a first strip extending parallel to and on a first side of the longitudinal axis and a second strip extending parallel to and on a second side of the longitudinal axis, opposite the first side of the longitudinal axis. A central strip extends between the first strip and the second strip, the central strip being removable from the first strip and the second strip. a first adhesive is applied to a first surface of each of the first and second strips. The first adhesive has a first adhesive strength. A second adhesive is applied to a second surface of each of the first and second strips, distal from the first surface. The second adhesive has a second adhesive strength, different from the first adhesive strength.

20 Claims, 3 Drawing Sheets

(56) References Cited

U.S. PATENT DOCUMENTS

| | | | | |
|---|---|---|---|---|
| 2016/0137885 A1* | 5/2016 | Maier | ................... | C09J 7/38 |
| | | | | 428/41.8 |
| 2016/0376471 A1* | 12/2016 | Barrios | ............. | C09J 183/10 |
| | | | | 428/41.8 |
| 2020/0130980 A1* | 4/2020 | Wold | ............. | E04F 21/1655 |
| 2022/0048067 A1* | 2/2022 | Wold | ................... | C09J 7/38 |

* cited by examiner

TAPE WITH DIFFERING STRENGTH ADHESIVES

BACKGROUND OF THE INVENTION

Field of the Invention

The present invention relates to a tape with a non-adhesive perforated central portion that can be applied to a generally horizontal surface so that the central portion can be removed and a material, such as an epoxy, can be applied to the surface where the central portion was removed without having to measure and cut individual pieces of tape to make a stencil form. The tape has two different strength adhesives, one on either side, to adhere the tape to a surface depending on the make-up and temperature of the surface.

Prior Art

When painting strips, such as to highlight the existence and location of stair treads, one typically applies strips of tape around the area to be painted, forming a void between the tape strips in which paint, epoxy, or other marking material is to be applied. This procedure, however, requires painstaking alignment of separate pieces of tape to form parallel lines when taping off the area to be painted.

Tape strips can be used on surfaces of differing textures and temperatures, which require different adhesion strength of the tape.

It would be beneficial to provide a tape that can provide parallel lines on an exposed surface quickly and easily and can be used on surfaces of differing textures and temperatures.

BRIEF SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a tape that includes a substrate having a central longitudinal axis extending therethrough. The substrate includes a first strip extending parallel to and on a first side of the longitudinal axis and a second strip extending parallel to and on a second side of the longitudinal axis, opposite the first side of the longitudinal axis. A central strip extends between the first strip and the second strip, the central strip being removable from the first strip and the second strip. A first adhesive is applied to a first surface of each of the first and second strips. The first adhesive has a first adhesive strength. A second adhesive is applied to a second surface of each of the first and second strips, distal from the first surface. The second adhesive has a second adhesive strength, different from the first adhesive strength.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings.

DETAILED DESCRIPTION

Figure 1:
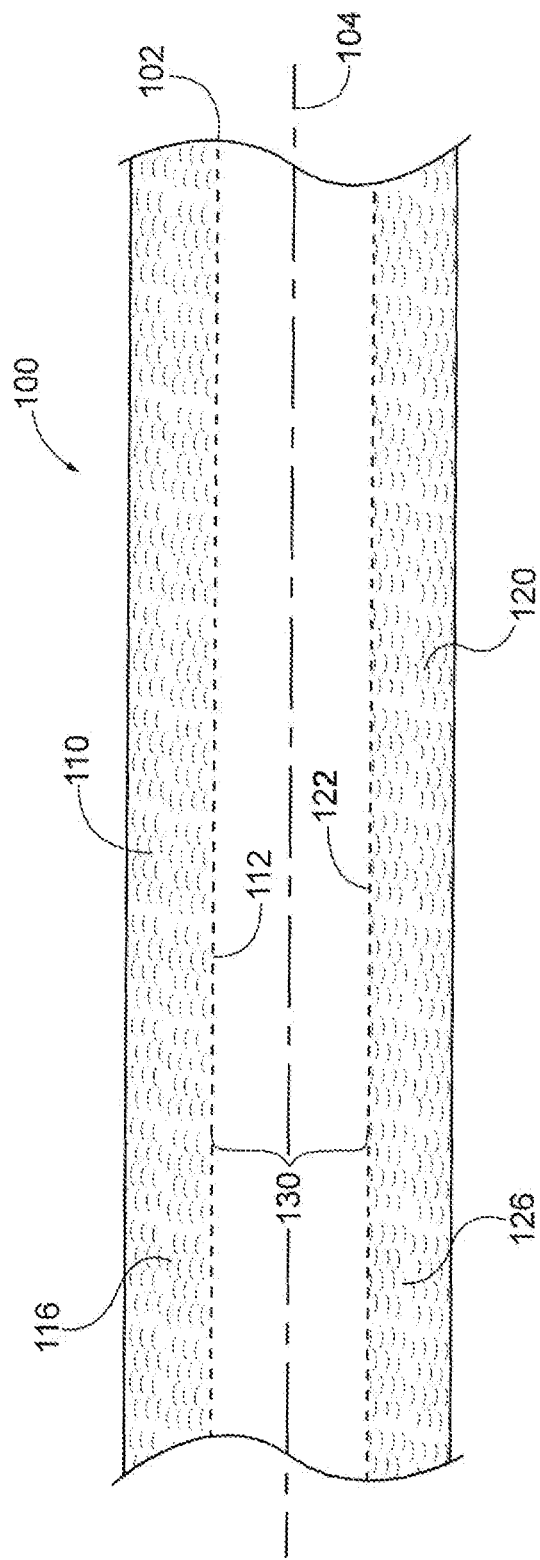
FIG. 1 is a top plan view of a tape with perforations according to an exemplary embodiment of the present invention.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

FIG. 1 shows an exemplary embodiment of a tape 100 with perforations that allows a user to apply the tape 100 to a surface 50 (shown in FIG. 2), remove a central portion of the tape 100 and apply paint, epoxy, or other marker material 52 to the surface 50 where the central portion was removed so that the marker material 52 remains on the surface 50. Tape 100 allows for straight line painting without having to painstakingly align separate pieces of tape to form parallel lines when taping off the area to be painted.

In an exemplary embodiment, surface 50 can be a stair tread, a floor, or other horizontal surface that is walked on. Surface 50 can be an interior surface or an exterior surface. Alternatively, surface 50 can be a vertical surface, a sloped surface, or any other surface onto which tape 100 can be applied.

Tape 100 includes a substrate 102 having a central longitudinal axis 104 extending therethrough. Substrate 102 includes a first strip 110 extending parallel to and on a first side of longitudinal axis 104 and a second strip 120 extending parallel to and on a second side of longitudinal axis 104, opposite the first side of longitudinal axis 104. A central strip 130 extends between first strip 110 and second strip 120.

First strip 110 is separated from second strip 120 by a constant distance, which is about the width of central strip 130. In an exemplary embodiment, first and second strips are each about one half inch wide and central strip 130 is between about one-half inch and about four inches wide. In another embodiment, the width of central strip 130 is about one inch.

A set of first perforations 112 separates first strip 110 from the central strip 130. Similarly, a set of second perforations 122 separates second strip 120 from central strip 130 such that first perforations 112 and second perforations 122 define central strip 130. First perforations 112 extend parallel to second perforations 122 such that central strip 130 can be separated from first strip 110 and second strip 120 along perforations 112, 122 such that, after central strip 130 is separated from first strip 110 and second strip 120, first strip 110 is spaced a constant distance from second strip 120 along the length of both strips 110, 120.

Separation of central strip 130 is done almost immediately after the tape is applied. Central strip 130 needs to be very easy to remove after the tape 100 is applied but also must be strong enough to maintain the integrity of the tape 100 during manufacturing, storage, shipping, and use. It was determined that a perforation slit length of between 0.5 and 3 inches and a ⅛" tie width produced the optimal strength characteristics to allow for easy removal of central strip 130.

Tape 100 can be applied in any length but can be typically applied in lengths of 3 to 5 feet. A typical striping application would be on a staircase (shown in FIG. 2) where two lengths of perhaps three and a half feet each would be applied on each step. Tearing or cutting of the tape with overlaminate can be difficult, awkward, and time consuming especially in these locations. Difficulty in tearing or cutting can cause the already placed tape to be disturbed, creating the need to be repositioned, increasing labor cost, and lowering the quality of the installation. A variety of tear line perforation styles and patterns were tested to ensure the tensile strength of the tear line was adequate for the application. The strength of the tear line must be low enough so that it is easy to tear after tape is applied to the surface. The tensile strength of the tear line must also be high enough to maintain the integrity of the tape during manufacturing, storage, shipping, and use. The tear line must also be sufficiently strong enough to not tear when the tape is removed after the coating is applied and spread. This is especially important for application to smooth, warm surfaces, and when the tape is used with mastic coatings. It was determined that a ¹⁄₁₆" perforation slit width and ¹⁄₁₆" tie width produced the optimum strength characteristics for the vertical tear line. It was also determined that spacing the perforated tear lines 3" apart was the best design for most applications, but this distance can also be adjusted based on various needs.

Use of a low % elongation (does not stretch) and moderately compressible tape material for substrate 102—elongation is measured as the percentage the tape can be stretched just before breaking. A material that did not stretch when applied or used is desired. A material that stretched would cause the product to lose the perfect spacing and parallel orientation of the sides during application of the coating, especially during application of a mastic.

A moderately compressible material for substrate 102 is also important especially when applying the coating to a porous of uneven surface. The ability to compress allowed the material of substrate 102 to deform slightly to "fill in" the spaces and irregularities inherent in these surfaces. By filling in the spaces, the material of substrate 102 would act as a dam to prevent the coating from flowing under the substrate 102. This ensures the stencil achieves a crisp edge and best appearance of the final product.

Percent elongation is desired to be under 10% and the compression strength at 25% deflection is desired to be to be 35 PSI (+/−10%) for best performance. Both values are measured per ASTM D3575.

Figure 4:
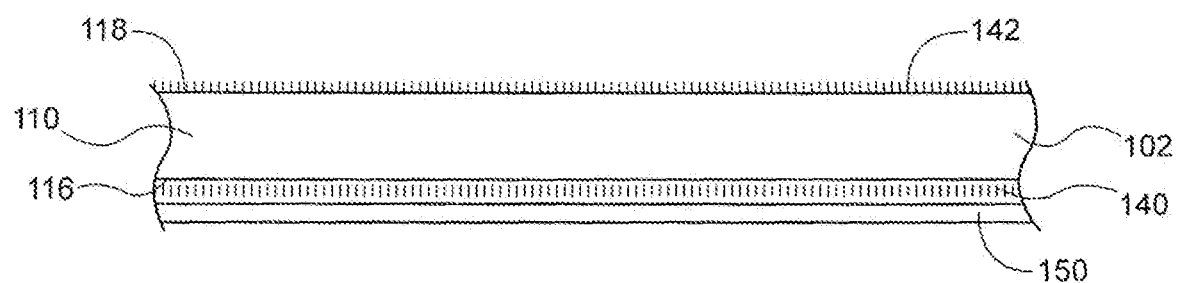
FIG. 4 is a side elevational view of a first embodiment of the tape.
Figure 5:
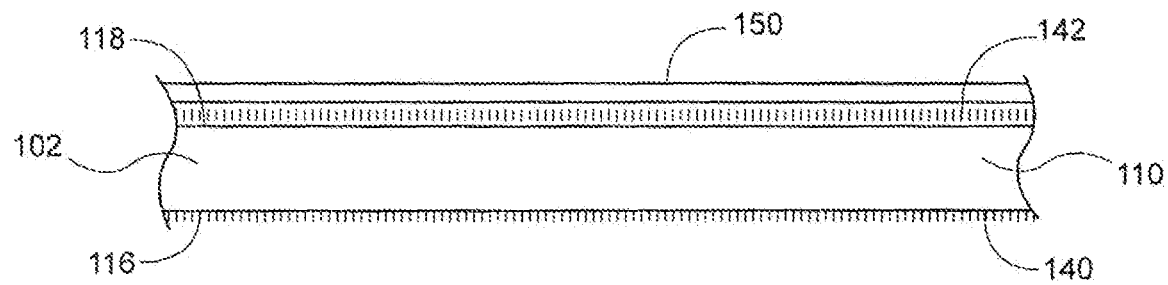
FIG. 5 is a side elevational view of a second embodiment of the tape.

Referring to FIGS. 4 and 5, a first adhesive 140 is applied to a first surface 116 of each of the first and second strips 110, 120, respectively. The first adhesive 140 has a first adhesive strength. A second adhesive 142 is applied to a second surface 118 of each of the first and second strips 110, 120, respectively, distal from the first surface 116. The second adhesive 142 has a second adhesive strength, different from the first adhesive strength. In an exemplary embodiment, the second adhesive strength is greater than the first adhesive strength.

Surface 116 with first adhesive 140 has a 15-minute Peel Adhesion Value of 8 to 12 ounces/inch at 75° F.; per Test Method PSTC-101, while surfaces 118 with second adhesive 142 have a 15-minute Peel Adhesion Value of 30 to 35 ounces/inch at 75° F.; per Test Method PSTC-101.

Depending on the application of tape 100, as shown in FIG. 4, a backer sheet 150 is attached to the first adhesive 140. Alternatively, as shown in FIG. 5, backer sheet 150 is attached to the second adhesive 142. In an exemplary embodiment, backer sheet 150 can be constructed from polypropylene or other suitable material.

Use of tape 100 is most often in an uncontrolled environment where the surface type and temperature can vary widely. In one extreme, the surface is smooth, non-porous and the application temperature can be as high as 85° F. or more. In this environment the strength and initial tack of the acrylic adhesive is very high, so the first surfaces 116 of tape 100 is used, and the second surfaces 118 are over laminated with backer sheet 150. In the other extreme, the surface can be uneven or porous and the application temperature is below 50° F. or less. In this environment the strength and initial tack of the acrylic adhesive is very low, so the second surfaces 118 of tape 100 is used, and the first surfaces 116 are over laminated with backer sheet 150. The ability to adjust from first to second adhesive strength on first surfaces 116 versus second surfaces 118 allows for the tape to be customizes to achieve the appropriate adhesive strength for the environment.

This is important for several reasons. First: to function properly and stay in the correct position to maintain the perfect spacing and parallel orientation of the sides during the application and spreading of the coating. If the bond strength to the surface is inadequate, the coating, especially in the case of a mastic, will cause the sides to debond and lose their position causing the installation to fail.

Second: to ensure an easy and clean removal without cohesive failure of the strips 110, 120, 130—if the adhesive strength is too high, then tape 100 will be too difficult to remove and can result in cohesive failure of strips 110, 120, 130.

Third: to ensure removal without the unwanted failure of lateral perforations between longitudinally adjacent strips 110, 120, 130. If the bond strength to the surfaces 116, 118 is too high, unwanted failure of the lateral perforations located across the entire width of the tape 100 will result. In an exemplary embodiment, the lateral perforations can include alternating 1/16" slit and tie perforations.

Figure 2:
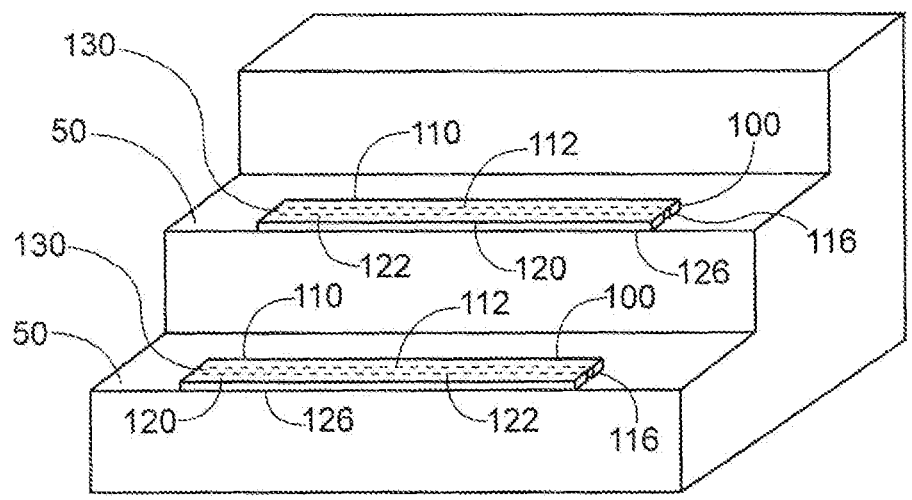
FIG. 2 is a top perspective view of the tape of FIG. 1, with the tape applied to a surface.
Figure 3:
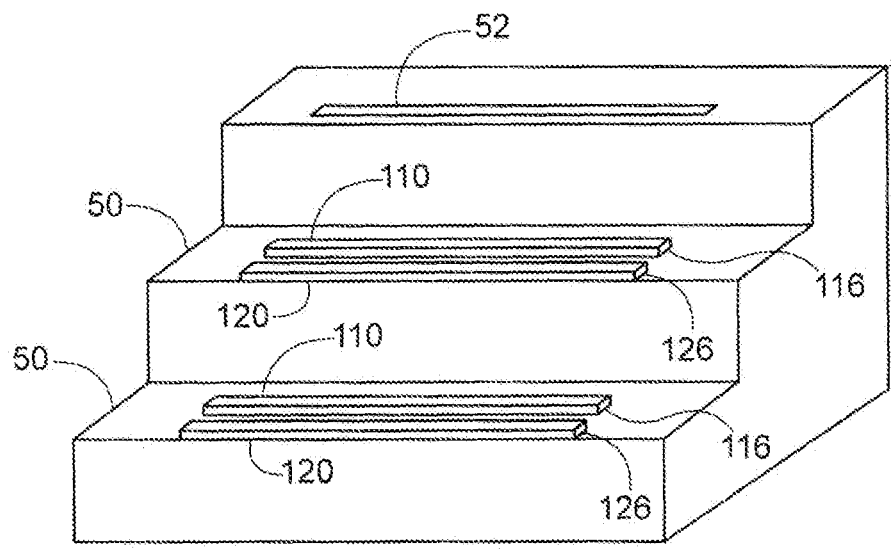
FIG. 3 is a top perspective view of the tape on the surface of FIG. 2, with a central portion of the tape having been removed.

FIG. 2 shows tape 100 being applied to a stair tread as the substrate 50 and FIG. 3 shows tape 100 with central strip 130 having been removed so that marker material 52 can be applied on substrate 50 between first strip 110 and second strip 120. Those skilled in the art will recognize that tape 100 can have other uses as well.

It will be further understood that various changes in the details, materials, and arrangements of the parts which have been described and illustrated in order to explain the nature of this invention may be made by those skilled in the art without departing from the scope of the invention as expressed in the following claims.

I claim:

1. A tape comprising:
 a substrate having a first surface, a second, opposing surface, and a central longitudinal axis extending therethrough; the substrate including:
  a first strip extending parallel to and on a first side of the longitudinal axis;
  a second strip extending parallel to and on a second side of the longitudinal axis, opposite the first side of the longitudinal axis;
  a central strip extending along the central longitudinal axis between the first strip and the second strip, the central strip being removable from the first strip and the second strip;
  a first adhesive applied to only the first surface excluding the central strip, the first adhesive having a first adhesive strength; and
  a second adhesive applied to only the second surface, distal from the first surface and excluding the central strip, the second adhesive having a second adhesive strength, different from the first adhesive strength.

2. The tape according to claim 1, wherein the first strip is separated from the second strip by a constant distance.

3. The tape according to claim 1, wherein the substrate comprises a first perforation separating the first strip from the central strip.

4. The tape according to claim 3, wherein the substrate comprises a second perforation separating the second strip from the central strip.

5. The tape according to claim 4, wherein the first perforation is parallel to the second perforation.

6. The tape according to claim 1, wherein the second adhesive strength is greater than the first adhesive strength.

7. The tape according to claim 6, further comprising a backer sheet attached to the first adhesive.

8. The tape according to claim 6, further comprising a backer sheet attached to the second adhesive.

9. The tape according to claim 6, wherein the second adhesive strength is over two times greater than the first adhesive strength.

10. A tape comprising:
 a substrate having a first surface and an opposing second surface;
 a first adhesive applied to only the first surface, the first adhesive having a first adhesive strength;
 a second adhesive applied to only the second surface, the second adhesive having a second adhesive strength, greater than the first adhesive strength; and
 a removable central portion of the substrate having no adhesive applied to either of the first surface or the second surface thereof.

11. The tape according to claim 10, further comprising a backer sheet attached to the first adhesive.

12. The tape according to claim 10, further comprising a backer sheet attached to the second adhesive.

13. The tape according to claim 10, wherein the second adhesive strength is over two times greater than the first adhesive strength.

14. The tape according to claim 10, further comprising a perforation between the central portion and a remainder of the substrate.

15. A tape comprising:
 a substrate having a first surface and a second, opposing surface, and a central longitudinal axis extending therethrough; the substrate including:
  a first strip extending parallel to and on a first side of the longitudinal axis;
  a second strip extending parallel to and on a second side of the longitudinal axis, opposite the first side of the longitudinal axis;
  a central strip extending between the first strip and the second strip, the central strip being removable from the first strip and the second strip;
  a first adhesive applied to only the first surface, the first adhesive having a first adhesive strength; and
  a second adhesive applied to only the second surface, distal from the first surface, the second adhesive having a second adhesive strength, different from the first adhesive strength.

16. The tape according to claim 15, further comprising a backer sheet attached to the first adhesive.

17. The tape according to claim 16, wherein the backer sheet comprises polypropylene.

18. The tape according to claim 15, further comprising a backer sheet attached to the second adhesive.

19. The tape according to claim 18, wherein the backer sheet comprises polypropylene.

20. The tape according to claim 15, wherein the second adhesive strength is over two times greater than the first adhesive strength.

* * * * *